United States Patent
Gorin

(10) Patent No.: US 7,210,667 B1
(45) Date of Patent: May 1, 2007

(54) REDUNDANT TESTABLE VALVE APPARATUS

(76) Inventor: Barney F. Gorin, 465 Golden Ash Mews, Gaithersburg, MD (US) 20878

( * ) Notice: Subject to any disclaimer, the term of this patent is extended or adjusted under 35 U.S.C. 154(b) by 70 days.

(21) Appl. No.: 11/176,309

(22) Filed: Jul. 8, 2005

(51) Int. Cl.
F16K 25/00 (2006.01)
(52) U.S. Cl. ...................................... 251/170; 251/210
(58) Field of Classification Search ................ 251/210, 251/170, 318, 333
See application file for complete search history.

(56) References Cited

U.S. PATENT DOCUMENTS

| | | | | |
|---|---|---|---|---|
| 2,893,685 A | * | 7/1959 | Van Camp | 251/210 |
| 3,770,008 A | * | 11/1973 | Turney | 251/210 |
| 3,945,390 A | * | 3/1976 | Huber | 251/333 |
| 3,960,364 A | * | 6/1976 | Hargrave | 251/210 |
| 4,232,695 A | * | 11/1980 | Roberge | 251/210 |
| 4,529,168 A | * | 7/1985 | Timmermans | 251/210 |

* cited by examiner

*Primary Examiner*—John Bastianelli
(74) *Attorney, Agent, or Firm*—Michael W. York

(57) ABSTRACT

Redundant valve apparatus including a first valve seat and a second valve seat located in the fluid passage of a hollow valve body between the inlet portion of the fluid passage and the outlet portion of the fluid passage and a poppet member having valve seat sealing surfaces for cooperating with and sealing the first valve seat and the second valve seat. One of the valve seats is fixed within the hollow valve body and the other valve seat is movable within the hollow valve body. The redundant valve apparatus also includes an actuator nut for controlling the operation of the poppet member and for moving the movable valve seat to cause the valve seat sealing surfaces on the poppet member to sequentially engage one valve seat and then the other valve seat. The redundant valve apparatus includes a spring for biasing the poppet member to the proper position within the hollow valve body such that the first valve seat and the second valve seat are properly positioned with respect to the valve seat sealing surfaces of the poppet member in all valve open and closed conditions. An expandable and contractible bellows surrounds the first valve seat and the second valve seat and the associated poppet member and the spring for providing a fluid tight seal in case either the first valve seat or the second valve seat and the associated valve seat sealing surfaces should leak. The bellows also permits the redundant valve apparatus to be leak tested when it is installed in position to be used.

10 Claims, 2 Drawing Sheets

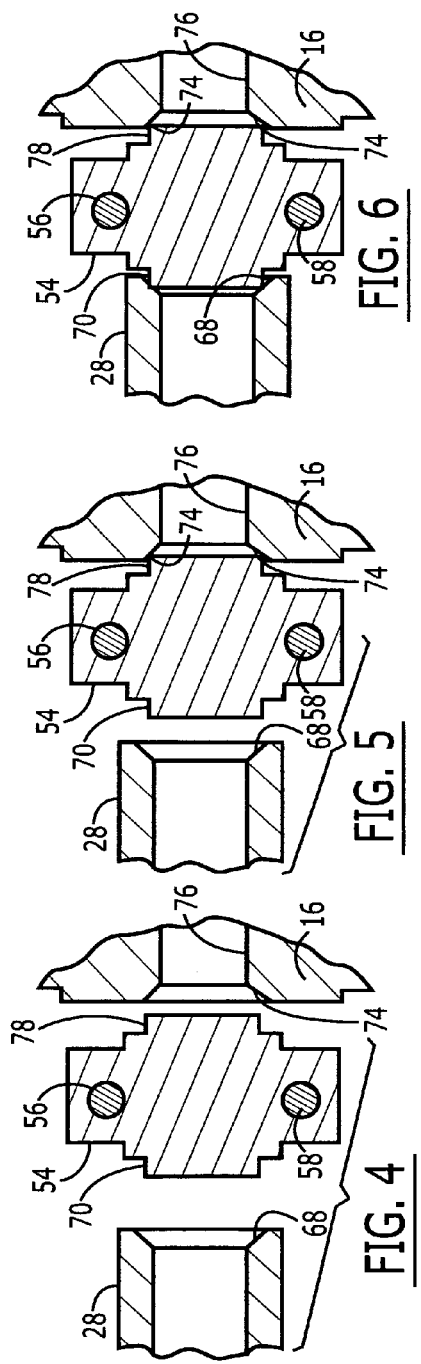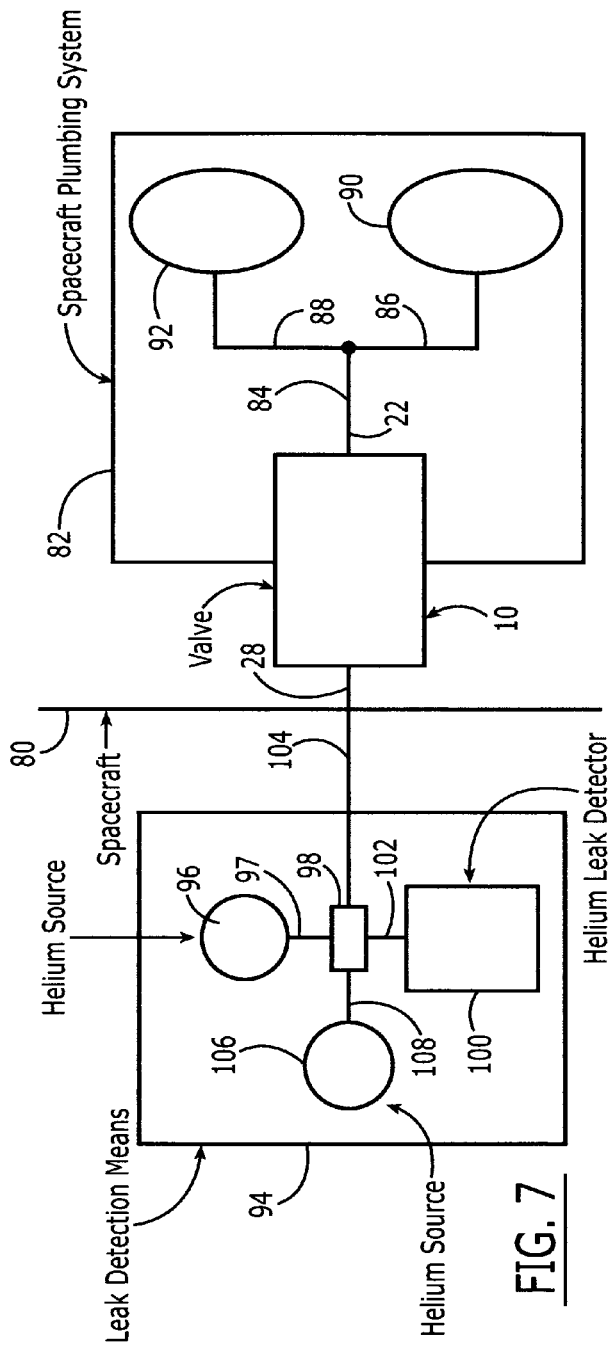

REDUNDANT TESTABLE VALVE APPARATUS

BACKGROUND OF THE INVENTION

Various spacecraft and missiles utilize liquid propellants including fuels and oxidizers that are very dangerous. These chemicals can react violently with other materials with disastrous results and can cause serious injury or death to personnel that may come into contact with such chemicals. This serious problem is greatly aggravated by the fact that large quantities of such materials are utilized in spacecraft and missile operations.

The tanks containing such fluids and oxidizers must be periodically filled and drained and such transfers of fluids are high risk operations. These operations involve connecting a suitable valve to an onboard tank on the spacecraft or missile and then opening the valve to permit passage of fluid through the valve and into or out of the onboard tank. Obviously, if a valve leaks during or after such an operation, it could have disastrous results. Consequently, such valves are thoroughly leak tested prior to being put in to operation. However, in spite of such testing, leaks have developed in previous valves during such transfer operations. These leaks have caused serious property damage and injuries to and the deaths of personnel involved in the transfer operations.

In order to help avoid these serious consequences, more than one valve can be utilized so that if one valve fails the other valve will most likely not fail. However, it is possible that several valves will fail even though they have been previously tested for leaks.

This invention overcomes these problems associated with previous valves used in dangerous spacecraft and missile fluid transfer operations and allows such transfer operations to be carried out with minimal risk of dangerous fluid leaks. With this invention, it is possible to leak test each of the redundant valve structures independently just prior to the transfer operation with the valve apparatus in place connected to the onboard tank. If one of the redundant valves fails to pass the independent leak test prior to or after the dangerous fluid transfer operation, appropriate corrective action can be taken so that the defective valve is not placed in service.

SUMMARY OF THE INVENTION

This invention relates to valve apparatus for controlling the flow of dangerous fluids and more particularly to valve apparatus that has redundant valves.

Accordingly, it is an object of the invention to provide valve apparatus that is capable of safely controlling the flow of dangerous fluids.

It is also an object of the invention to provide redundant valve apparatus for controlling the flow of dangerous fluids that has a plurality of individual valve structures.

It is also an object of the present invention to provide redundant valve apparatus for controlling the flow of dangerous fluids that has a plurality of individual valve structures that are separately operated.

It is also an object of the present invention to provide redundant valve apparatus for controlling the flow of dangerous fluids that has a plurality of individual valve structures that are sequentially operated.

It is also an object of the present invention to provide redundant valve apparatus with a plurality of individual sequentially operated valve structures in which all the sequential valve structures must be operated to permit fluid to flow through the redundant valve apparatus.

It is an object of the present invention to provide redundant valve apparatus that is leak free.

It is an object of the present invention to provide redundant valve apparatus that is easy to check for leaks.

It is an object of the present invention to provide redundant valve apparatus in which every seal can be checked for leaks when it is installed.

It is an object of the present invention to provide redundant valve apparatus that is easy to check for leaks when it is connected to a spacecraft fluid tank.

It is an object of the present invention to provide redundant valve apparatus that is easy to check for leaks when it is connected to a spacecraft fuel tank.

It is an object of the present invention to provide redundant valve apparatus that is easy to check for leaks when it is connected to a spacecraft oxidizer tank.

It is an object of the present invention to provide a redundant valve apparatus with a plurality of individual valve structures arranged so that each individual valve can be checked for leaks independently.

It is an object of the present invention to provide a redundant valve apparatus with a plurality of individual valve structures arranged so that each can be leak checked using a leak detector.

It is an object of the invention to provide a redundant valve apparatus with a plurality of individual valve structures where the individual valve structures can be individually leak checked using helium and a helium leak detector.

It is an object of the invention to provide a redundant valve apparatus with a plurality of individual valve structures where the individual valve structures are arranged so they can be individually leak checked using helium and a leak detector while the redundant valve apparatus is installed.

It is an object of the invention to provide a redundant valve apparatus with a plurality of individual valves where the individual valves are arranged so they can be individually leak checked using helium and a helium leak detector while the redundant valve apparatus is installed and connected to a fluid tank on a spacecraft or the like.

It is an object of the invention to provide a redundant valve apparatus with a plurality of individual valves where one or more of the valves can be individually checked with a helium leak detector after propellant transfer.

It is an object of the invention to provide a redundant valve apparatus that is simple in its operation.

It is an object of the invention to provide a redundant valve apparatus that is light in weight.

It is an object of the invention to provide a redundant valve apparatus that has few parts.

It is an object of the invention to provide a redundant valve apparatus that is easy to operate.

It is an object of the invention to provide a redundant valve apparatus that is easy to manufacture.

These and other objects of the invention will become apparent from the following description of the redundant valve apparatus invention that includes a hollow valve body or housing having a fluid passage with an inlet portion for permitting the entrance of fluid and an outlet portion for permitting the exit of fluid, a first valve seat and a second valve seat located in the fluid passage of the hollow valve body between the inlet portion of the fluid passage and the outlet portion of the fluid passage and poppet means for cooperating with and sealing the first valve seat and the second valve seat comprising a movable cylindrical poppet member located within the hollow valve body between the inlet portion of the fluid passage and the outlet portion of the fluid passage that has a first valve seat sealing surface positioned to engage and seal the first valve seat and a second valve seat sealing surface positioned to be engaged by and seal the second valve seat. The redundant valve apparatus also includes poppet activating means associated with the poppet means for moving the poppet member of the poppet means so that the valve seat sealing surfaces of the poppet member sequentially seal one valve seat and then the other valve seat. The redundant valve apparatus includes biasing means for biasing the poppet member to a position within the hollow valve apparatus body where the first valve seat and the second valve seat are not closed or sealed by the valve seat sealing surfaces of the poppet member. In the preferred embodiment, this biasing means comprises a resilient member and in particular a compression spring that pushes against the poppet member. The redundant valve apparatus also includes sealing means surrounding the first valve seat and the second valve seat and the associated poppet means for providing a fluid tight seal in case either the first valve seat or the second valve seat and the associated poppet member seal should leak. In the preferred embodiment this sealing means comprises an expandable and contractible bellows. The sealing means also permits the redundant valve apparatus to be leak tested when it is installed.

BRIEF DESCRIPTION OF THE DRAWINGS

The invention will be hereinafter more fully described with reference to the accompanying drawings in which:

FIG. 4 is a view of a portion of the structure illustrated in FIG. 3 taken substantially within the circle 4 thereof showing features of the poppet member and related structure forming an important part of the invention with the poppet member in its fully open position;

FIG. 5 is a view of the structure set forth in FIG. 4 showing the poppet member and related structure with one valve structure in its closed position;

FIG. 6 is a view of the structure set forth in FIGS. 4 and 5 but showing the poppet member and related structures with both valve structures in the closed position; and FIG. 7 is a schematic diagram illustrating how the redundant valve apparatus is connected to spacecraft structure and how it is set up for leak testing.

DETAILED DESCRIPTION OF THE PREFERRED EMBODIMENT

Figure 1:
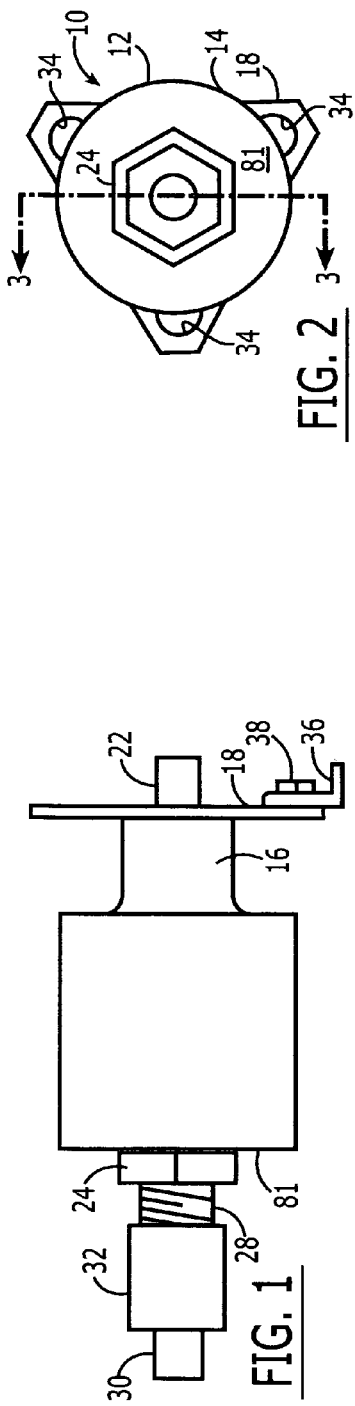
FIG. 1 is a side elevational view of the redundant valve apparatus invention.
Figure 2:
FIG. 2 is an end elevational view of the redundant valve apparatus invention taken from the left of FIG. 1.
Figure 3:
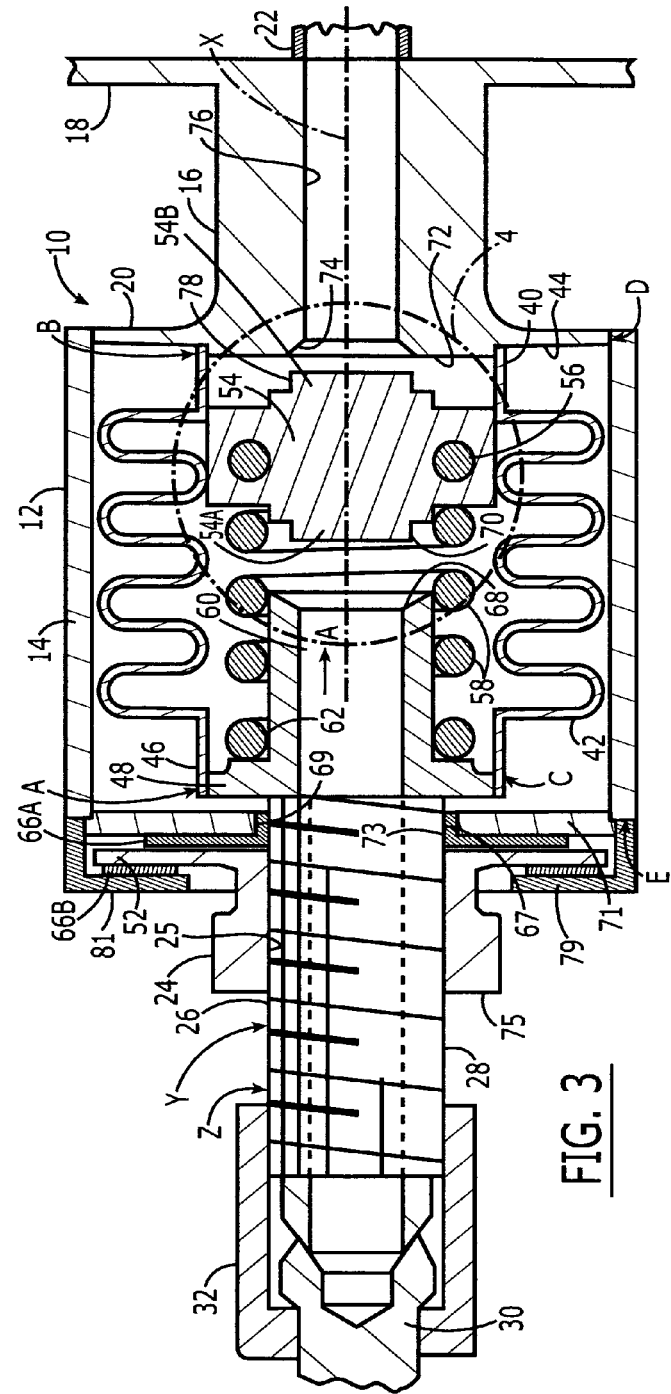
FIG. 3 is an enlarged sectional view of the redundant valve apparatus invention illustrated in FIGS. 1 and 2 taken substantially on the line 3—3 in FIG. 2, with certain portions broken away.

Referring first to FIGS. 1 through 3, the redundant valve apparatus is illustrated and is designated generally by the number 10. The redundant valve apparatus 10 comprises a valve apparatus body or housing 12 that includes an outer hollow cylindrical cover 14. The valve apparatus also includes a base support 16 that has a generally flat mounting plate 18 located on its outer end portion and an enlarged inner portion 20 that fits inside and is welded to one end of the cylindrical cover 14. The valve apparatus 10 also includes an outlet tube 22 that extends outward from the mounting plate 18 of the base support 16. An activator nut 24 with its internal threads 25 is threaded onto the threads 26 on the outside of an inlet tube 28 that extends out of the other end of the valve housing 12 than the end with the outlet tube 22. The outer end of the inlet tube 28 is closed by a pressure seal cap 30 and an associated pressure seal nut 32 that are conventional and known in the art and form what is known in the art as an AN fitting. As illustrated in FIGS. 1 and 2, the mounting plate 18 has three mounting holes 34 for mounting the mounting plate 18 and the entire valve apparatus 10 to appropriate spacecraft mounting structure 36 by appropriate mounting bolts such as the bolt 38 or the like.

FIG. 3, is a sectional view of the redundant valve apparatus 10 structure set forth in FIGS. 1 and 2, and illustrates the details of the structure in the interior of the valve housing 12. As illustrated in FIG. 3, one end portion 40 of a hollow bellows 42 is connected by welding to the inner surface 44 of the base support 16 and the other opposite end portion 46 of the bellows 42 is connected by welding to an enlarged flange portion 48 of the inlet tube 28. A cylindrical shaped circular cross section poppet member 54 is centrally located within the hollow bellows 42 and is connected to one end 56 of a compression spring 58 that surrounds a portion 60 of the inlet tube 28 that is located within the bellows 42. The other end portion 62 of the spring 58 is connected to the flange portion 48 of the inlet tube 28. The activator nut 24 has a flange portion 52 located adjacent to and between generally circular shaped thrust bushings 66A and 66B. The flange portion 52 and bushings 66A and 66B are located within a cylindrical cup shaped nut retainer cap 81 that is connected by welding to a circular flat shaped housing end portion 71 that is connected to the end of the hollow cover 14 of the housing 12. Bushing 66A has a projecting cylindrical portion 67 that is sized and shaped to fit in a hole 69 in the housing end portion 71. The thrust bushing 66A has a centrally located hole 73 that is sized and shaped to receive a portion of the inlet tube 28. The other thrust bushing 66B is flat and ring shaped and is located adjacent a lip portion 79 of the nut retainer cap 81. These bushings, 66A and 66B, are formed and fabricated using techniques known in the art and as such bushings 66A and 66B in themselves form no part of the present redundant valve apparatus 10 invention.

The inner end of the portion 60 of the inet tube 28 that is located within the bellows 42 has a valve seat 68 that is sized, shaped and positioned to come into sealing engagement with the corresponding mating sealing surface 70 on the poppet member 54. In a similar manner, the inner end portion 72 of the base support 16 that is located within the bellows 42 has a fixed valve seat 74 at the inner end of a circular shaped cross section hole 76 that extends through the base support 16 to the outlet tube 22. This valve seat 74 is sized, shaped and positioned to come into sealing engagement with the corresponding mating sealing surface 78 on the poppet member 54.

In the preferred embodiment, the valve seats 68 and 74 are substantially identical as are the corresponding mating sealing surfaces 70 and 78 on the poppet member 54. This, plus the fact that the poppet member 54 has two end portions 54A and 54B that are substantially identical, allows the poppet member 54 to be reversed during assembly. This is an intended safety feature since in view of this arrangement, the poppet member 54 cannot be assembled incorrectly. The valve seat 68 is movable within the housing 12 along with the movable inlet tube 28 that moves within the housing 12, but the valve seat 74 is fixed within the housing 12 and is not movable with respect to the housing 12. It will be noted that the valve seats 68 and 74 are located within the housing 12 so that they face each other and are substantially centered on the same line or axis identified by the letter X. It will also be noted that the poppet member 54 is positioned within the valve housing 12 so that it and its valve sealing surfaces 70 and 78 are substantially centered on and substantially move laterally back and forth on the same axis or line X. The valve seats 68 and 74 face the respective mating sealing surfaces 70 and 78 on the opposite ends of the poppet member 54. Since the spring 58 that is connected to the poppet member 54 acts to position the poppet member 54, the long axis of the spring 58 through its center also substantially coincides with the same axis or line X. This positioning of the inlet tube 28, the poppet member 54, the spring 58, the valve seats 68 and 74 and the associated mating sealing surfaces 70 and 78 is important for the proper functioning of the redundant valve apparatus 10.

As illustrated in FIG. 3 and as previously indicated, the compression coil spring 58 that is located within the bellows 42 inside the hollow housing 12 that has one end portion 56 connected to the poppet member 54, also has the other end portion 62 that is connected to the flange portion 48 of the inlet tube 28. With the valve apparatus 10 in the fully open position, this coil spring 58 biases the poppet member 54 into a position where the sealing surfaces 70 and 78 of the poppet member 54 are not in contact with either of the valve seats 68 or 74 and consequently, there is no restriction of flow from the inlet tube 28 through the bellows 42 and out of the outlet tube 22 or in the reverse direction. This is the normal condition for the redundant valve apparatus 10 prior to activation of the activator nut 24. This is the condition of the valve apparatus 10 illustrated in FIG. 3.

The sequence of operation of the redundant valve apparatus 10 is illustrated sequentially in FIGS. 4, 5, and 6. FIG. 4 is an enlarged portion of the inlet tube 28, the poppet member 54 and the associated valve seats 68 and 74 and related structure as well as portions of the compression coil spring 58 that is taken within the circle 4 of FIG. 3. For clarity, portions of the coil spring 58 that would normally be shown have been omitted from FIG. 4. FIGS. 5 and 6 illustrate the same structure set forth in FIG. 4, but illustrate the position of the structure at different stages of operation of the redundant valve apparatus 10. These FIGS. 4, 5, and 6 show how the redundant valve apparatus 10 operates when the activator nut 24 is turned to operate the redundant valve apparatus 10.

The normal condition for the redundant valve apparatus 10, prior to activation of the activator nut 24, was previously indicated in FIG. 3. Since FIG. 4 is an enlarged view of a portion of the structure set forth within the circle 4 in FIG. 3, FIG. 4 also illustrates the poppet member 54 and inlet tube 28 and associated structure prior to activation of the activator nut 24. As previously indicated, in this pre-activation state, the coil spring 58 biases the poppet member 54 into a position where the sealing surfaces 70 and 78 of the poppet member 54 are not in contact with either of the valve seats 68 or 74 and consequently, there is no restriction of flow from the inlet tube 28 through the hollow bellows 42 in the valve body or housing 12 and out of the outlet tube 22 or in the reverse direction.

It should be noted that the flange portion 52 of the actuator nut 24 can not move out of or into the housing 12 in view of the lip 79 of the cylindrical shaped nut retainer cap 81 and the adjacently located cylindrical shaped housing end portion 71 that are both welded to one end of the cover 14 of the housing 12. Consequently, when the activator nut 24 is rotated in the appropriate direction, in view of the threads 25 on the inside of the activator nut 24 that mesh with the threads 26 on the outside of the inlet tube 28, the inlet tube 28 with its valve seat 68 moves to the right or toward the fixed valve seat 74 as illustrated in FIG. 3 by the arrow A since the flange portion 52 of the activator nut 24 contacts the outer lip portion 79 of the nut retainer 81 that is connected to the cover 14 of the valve housing 12 which prevents the activator nut 24 from moving outward and out of the valve housing 12.

As the activator nut 24 continues to be appropriately turned, the inlet tube 28 continues to be moved to the right as illustrated in FIGS. 3 and 4 or toward the fixed valve seat 74 at the inner end of the hole 76 in the base support 16. As the inlet tube 28 moves to the right or toward the valve seat 74, as indicated by the arrow A, it also causes the attached bellows 42 to be compressed to the right and the flanged portion 48 of the inlet tube 28 to move to the right and the spring 58 that is in contact with the flanged portion 48 of the inlet tube 28 to also move to the right toward the fixed valve seat 74. As the movement of the spring 58 continues, the mating sealing surface 78 of the poppet member 54 comes into contact with the valve seat 74 and further turning of the activating nut will cause the compression spring 58 to compress and exert force on the poppet member 54 that is transmitted to the mating sealing surface 78 and the valve seat 74 that is in contact with the mating sealing surface 78 to form a fluid tight seal between the mating sealing surface 78 and the abutting valve seat 74. This is the position of the mating surface 78, the abutting valve seat 74 of the poppet member 54 and the compression spring 58 that is shown in FIG. 5.

With the mating surface 78 of the poppet member 54 in sealing contact with the valve seat 74 at the inner end of the hole 76 in the base support 16 as illustrated in FIG. 5, the entrance to the hole 76 through the base support 16 is sealed and no fluid can pass from the interior of the bellows 42 into the hole 76 through the base support 16 and through the adjacent connected outlet tube 22 or in the reverse direction. Consequently, with the poppet member 54 in this position, no fluid can flow through the redundant valve apparatus 10 due to activation of this single valve means comprising the mating sealing surface 78 of the poppet member 54 in sealing contact with the valve seat 74 alone.

As illustrated in FIG. 3, to assist the user of the redundant valve apparatus 10 in knowing when the actuator nut 24 has been turned sufficiently so that the inlet tube 28 has moved sufficiently to cause the mating sealing surface 78 on the poppet member 54 to contact and seal the fixed valve seat 74, a visible mark, identified by the reference letter Y, is provided at the appropriate location on the exterior threads 26 of the inlet tube 28. As a result when the end 75 of the actuator nut 24 is located adjacent to this mark Y, the user knows that the surface 78 is in sealing contact with the valve seat 74.

As the activator nut 24 continues to be turned, the inlet tube 28 continues to be moved to the right or toward the fixed valve seat 74 at the inner end of the hole 76 in the base support 16. As indicated previously, this also causes the attached bellows 42, flange portion 48 of the inlet tube 28 and the spring 58 that is in contact with the flange portion 48 of the inlet tube 28 to move to the right toward the fixed valve seat 74. This causes the spring 58 that is connected to the poppet member 54 to continue to be compressed and to continue to exert force on the poppet member 54 that is transmitted to the mating sealing surface 78 and the valve seat 74 that is in contact with the mating surface 78 to continue to form a fluid tight seal between the mating surface 78 and the abutting valve seat 74.

Continued turning of the activator nut 24, which comprises means for controlling movement of the movable valve seat 68, results in the inlet tube 28 being moved to the right or toward the fixed valve seat 74 so that the movable valve seat 68 is pushed into sealing contact with the associated sealing surface 70 on the poppet member 54 as illustrated in FIG. 6. As illustrated in FIG. 6, with the movable valve seat 68 is in sealing contact with the associated sealing surface 70 on the poppet member 54, no fluid can flow through the hollow inlet tube 28 past the movable valve seat 68 or in the reverse direction since the movable valve seat 68 is sealed by the associated sealing surface 70 of the poppet member 54 that is in sealing contact with the movable valve seat 68.

As illustrated in FIG. 3, to assist the user of the redundant valve apparatus 10 in knowing when the actuator nut 24 has been turned sufficiently so that the inlet tube 28 has moved sufficiently to cause the movable valve seat 68 to contact and be sealed by mating sealing surface 70 on the poppet member 54, a visible mark, identified by the reference letter Z, is provided at the appropriate location on the exterior threads 26 of the inlet tube 28. As a result when the end 75 of the actuator nut 24 is located adjacent to this mark Z, the user knows that the sealing surface 70 is in sealing contact with the valve seat 68.

With the poppet member 54 and associated structure in the position illustrated in FIG. 6, no fluid can flow through the redundant valve apparatus 10 due to the valve seat 74 being in sealing contact with the associated sealing surface 78 on the poppet member 54 and also the sealing surface 70 being in sealing contact with the associated movable valve seat 68. Consequently, there are two valve structures or sealed valve seats 68 and 74 that prevent the flow of fluid in either direction through the hollow inlet tube 28 and into and out of the hollow outlet tube 22 of the redundant valve apparatus 10. Even if one of these valve structures or sealed valve seats 68 or 74 should fail, there is still the other valve structure or sealed valve seat 68 or 74 to prevent fluid flow through the redundant valve apparatus 10.

FIG. 7 is a schematic diagram illustrating how the redundant valve assembly 10 is tested when it is installed in a spacecraft 80. As illustrated, the redundant valve assembly 10, that is represented in FIG. 7 by the block that is labeled with the number 10, is installed into the spacecraft plumbing system represented by the block numbered 82. As illustrated, the hollow outlet tube 22 of the redundant valve apparatus 10 is connected to the onboard fluid fill and drain line 84 through conventional means known in the art. This fluid line 84 then is connected to the respective onboard fluid lines 86 and 88 that are in fluid communication with the respective onboard tanks 90 and 92. These tanks 90 and 92 and the connected fluid lines could be for fuel for the spacecraft or for an oxidizer fluid or for any other fluid for the spacecraft such as helium, xenon, nitrogen, hydrazine or hydrogen peroxide.

The fact that the redundant valve apparatus 10 has expandable and contractible sealing means comprising a hollow bellows 42 located around the first valve seat 68 and the second valve seat 74 and the associated respective mating sealing surfaces 70 and 78 on the poppet member 54 as well as the coil spring 58 permits the redundant valve apparatus 10 to be tested for leaks while it is connected to the spacecraft 80. In this connection, a test gas such as helium in the bellows 42 is used in leak testing the first valve seat 68 and the second valve seat 74 and the associated respective mating sealing surfaces 70 and 78 on the poppet member 54.

FIG. 7 also illustrates in the block diagram form leak detection means 94 for detecting leaks in the redundant valve apparatus. As illustrated, the leak detection means 94 has a helium test gas source such as a container 96 that has a helium gas line 97 extending from it to a four way fluid valve represented by the number 98. The leak detection means 94 also comprises a helium leak detector 100 with a gas line 102 that is connected to and in fluid communication with the four way valve 98. The four way valve 98 is in turn connected to the inlet tube 28 of the redundant valve assembly 10 through a fluid conduit 104 that is connected in a conventional manner by removing the AN pressure seal nut 32 and pressure seal cap 30 on the outer end of the inlet tube 28 of the redundant valve assembly 10. A vacuum source 106 is also part of or associated with the leak detection means 94. This vacuum source 106 is in fluid communication with the four way valve 98 through the connected conduit 108.

The manner in which the leak detection means 94 is used is as follows. First, the outlet tube 22 of the redundant valve apparatus 10 is connected to the spacecraft fill and drain line 84 in a conventional manner with the poppet member 54 in its neutral or inactivated position as illustrated in FIG. 4. The inlet tube 28 of the redundant valve apparatus 10 is then connected to the tube 104 of the leak detection means 94. The four way valve 98 is then appropriately activated and a vacuum is applied through the redundant valve apparatus 10 from the vacuum source 106, through the line 108, the four way valve 98, the conduit 104 and the inlet tube 28 and through the redundant valve apparatus 10 and the outlet conduit 22. From the outlet conduit 22, the vacuum is applied through the lines 84, 86 and 88 and to the respective tanks 90 and 92. Using the four way valve 98, the vacuum source 106 is then shut off and helium from the helium source 96 is allowed to pass through the conduit 97 to the four way valve 98, through the line 104 and the inlet tube 28 and through the redundant valve apparatus 10 and the outlet conduit 22. From the outlet conduit 22, helium passes through the lines 84, 86 and 88 and into the respective tanks 90 and 92.

After the helium has been introduced through the redundant valve apparatus 10 and into the tanks 90 and 92 as well as all of the lines between the redundant valve apparatus 10 and the tanks 90 and 92, the activator nut 24 is activated by turning it in so that the poppet member 54 moves toward the fixed valve seat 74. The activator nut 24 continues to be activated to a point where the mating sealing surface 78 on the poppet member 54 comes into sealing contact with the fixed valve seat 74 to form a fluid tight seal to prevent passage of fluid into or out of the hole 76 through the base support 16. After this occurs, the four way valve 98 is appropriately moved and the vacuum source 106 is activated to apply a vacuum through the line 108, the four way valve 98, the line 104 and the inlet tube 28 and the interior of the redundant valve apparatus 10 up to the point where the mating sealing surface 78 is in sealing contact with the valve seat 74 as illustrated in FIG. 5.

The vacuum source 106 is then shut off and the four way valve is appropriately operated so that the hollow inlet tube 28, the conduit 104 and the conduit 102 are in fluid communication with the helium leak detector 100. After a suitable period of time, the helium leak detector 100 is activated to sense the presence of any helium gas that may have passed through the valve seat 74 and the mating sealing surface 78 that is in contact with the valve seat 74 thus filling the volume of the bellows 42 with helium. If helium is detected, that means there is a faulty seal between the valve seat 74 and the mating sealing surface 78 and appropriate corrective action, known in the art, is taken. After this corrective action, the testing sequence would be restarted. If no helium is detected, that means the seal between the valve seat 74 and the mating sealing surface 78 is satisfactory and the testing continues.

In order to continue the testing, the helium detector 100 is shut off and the four way valve 98 is activated to allow helium gas to flow from the helium source 96 through the conduit 97, through the four way valve 98, through the line 104 and the hollow inlet tube 28 and through the redundant valve apparatus 10, including the bellows 42, up to the point where the mating sealing surface 78 is in sealing contact with the valve seat 74. The activator nut 24 is then activated or rotated further so that the valve seat 68 on the inlet tube 28 comes into sealing contact with the mating sealing surface 70 on the poppet member 54 to form a fluid tight seal to prevent passage of fluid into or out of the inlet tube 28. The four way valve 98 is then switched and the vacuum source 106 is activated to apply a vacuum through the line 108, the four way valve 98, the line 104 and the hollow inlet tube 28 up to the point where the mating sealing surface 70 on the poppet member 54 is in sealing contact with the valve seat 68.

The vacuum source 106 is then shut off and the four way valve 98 is operated to connect the helium leak detector 100 and its associated conduit 102, through the four way valve 98, through the conduit 104 to the inlet tube 28 of the redundant valve apparatus 10. Then, after a suitable period of time, the helium leak detector 100 is activated to sense the presence of any helium gas that may have passed from the bellows 42 through the valve seat 68 and the mating sealing surface 70 that is in sealing contact with the valve seat 68. If helium is detected that means there is a faulty seal between the valve seat 68 and the mating sealing surface 70 and appropriate corrective action, known in the art, is taken. After this corrective action, the entire testing sequence would be restarted. If no helium is detected, that means the seal between the valve seat 68 and the mating sealing surface 70 is satisfactory. Testing is then complete and the redundant valve apparatus 10 is satisfactory.

The redundant valve apparatus 10 may be checked for leakage past the seal formed by the surfaces 68 and 70 after propellant transfer is completed by first closing the seal formed by the surfaces 74 and 78. Then, the interior of the bellows 42 is decontaminated using techniques known in the art and finally the volume inside the bellows 42 is pressurized with helium for leak testing the seal formed by the surfaces 68 and 70 in the previously described manner.

The redundant valve apparatus 10 is manufactured from suitable stainless steel used for spacecraft type valves that is known in the art through suitable cutting, forming, machining and finishing techniques known in the art. The redundant valve apparatus 10 is assembled using welded joints with a particular required joint welding sequence for certain valve components. In this connection, the sequence of welds to be made are indicated by the capitol letters B through E in FIG. 3. As indicated in FIG. 3, the first weld that is made is at the junction of the bellows 42 and the base support 16 that is labeled with the letter B. The spring 58 must be attached to the flange portion 48 of the inlet tube 28 prior to these components and the poppet member 54 and associated spring 58 being assembled inside the hollow bellows 42. The inlet tube 28 and attached spring 58 combination along with the poppet member 54 are then positioned inside the hollow bellows 42. The second weld that is made is at the junction of the bellows 42 and the enlarged flange portion 48 of the inlet tube 28 that is labeled with the letter C. Next, the outer cover 14 is welded to the base support 16 as indicated by the letter D. Then the final weld is at the junction of the nut retainer 81 and the hollow cover 14 as indicated by the letter E.

Although the invention has been described in considerable detail with reference to a certain preferred embodiment, it will be understood that variations or modifications may be made within the spirit and scope of the invention as defined in the appended claims.

What is claimed is:

1. Valve apparatus comprising a hollow valve body having a fluid passage with an inlet portion for permitting the entrance of fluid and an outlet portion for permitting the exit of fluid, a first valve seat and a second movable valve seat located in the fluid passage of the hollow valve body between the inlet portion of the fluid passage and the outlet portion of the fluid passage, poppet means located between the valve seats within the hollow valve body for cooperating with the first valve seat and the second valve seat located in the fluid passage of the hollow valve body between the inlet portion of the fluid passage and the outlet portion of the fluid passage to engage and seal both the first valve seat and the second valve seat in the closed position, and means for controlling the operation of the poppet means and the movable valve seat.

2. The valve apparatus of claim 1 wherein the poppet means is movable within the hollow valve body.

3. The valve apparatus of claim 2 wherein the poppet means has an open position where neither the first valve seat nor the second valve seat is engaged and sealed by the poppet means.

4. The valve apparatus of claim 3 further comprising biasing means for biasing the poppet means in position within the hollow valve body.

5. The valve apparatus of claim 4 wherein the biasing means normally biases the poppet means in the open position within the hollow valve body.

6. The valve apparatus of claim 5 wherein the biasing means comprises a resilient member.

7. The valve apparatus of claim 6 wherein the resilient member comprises a spring.

8. The valve apparatus of claim 4 further comprising expandable and contractible sealing means surrounding the first valve seat and the second valve seat for sealing the area within the hollow valve body containing the first valve seat and the second valve seat.

9. The valve apparatus of claim 8 wherein the expandable and contractible sealing means comprises means for permitting the valve apparatus to be leak tested.

10. The valve apparatus of claim 9 wherein the expandable and contractible sealing means comprises means comprises a bellows.

* * * * *